United States Patent [19]

Betteridge

[11] Patent Number: 4,750,781

[45] Date of Patent: Jun. 14, 1988

[54] VEHICLE OPENING ROOF

[75] Inventor: Timothy D. Betteridge, Birmingham, England

[73] Assignee: Britax Weathershields Limited, Birmingham, England

[21] Appl. No.: 10,955

[22] Filed: Feb. 4, 1987

[30] Foreign Application Priority Data

Feb. 7, 1986 [GB] United Kingdom ............... 8603076

[51] Int. Cl.⁴ ............................ B60J 7/08; B60J 7/11; B60J 7/00
[52] U.S. Cl. .................................. 296/214; 296/216; 296/218; 24/297; 52/716
[58] Field of Search ............... 296/214, 216, 218, 224; 24/292, 297, 459; 52/511, 716, 464

[56] References Cited

U.S. PATENT DOCUMENTS

| | | | |
|---|---|---|---|
| 3,294,436 | 12/1966 | Bull et al. | 296/214 X |
| 3,732,659 | 5/1973 | LaBarge | 52/464 X |
| 4,304,073 | 12/1981 | Reith | 52/716 |
| 4,585,269 | 4/1986 | Lievesley | 296/214 |

FOREIGN PATENT DOCUMENTS

| | | | |
|---|---|---|---|
| 0076218 | 4/1983 | European Pat. Off. | 296/218 |
| 2123757 | 2/1984 | United Kingdom | 296/216 |

Primary Examiner—Dennis H. Pedder
Attorney, Agent, or Firm—Hayes, Davis & Soloway

[57] ABSTRACT

An opening roof for a motor vehicle comprises a frame mounted in an opening in a vehicle roof. A trim member is attached to the bottom of the frame and has an outwardly projecting flap which covers the adjacent edge of the vehicle roof trim. A portion of the frame projects below the vehicle and carries first and second protuberances on side surfaces facing towards and away from the opening respectively. The trim member has first and second side walls which abut against respective side surfaces of the frame. The first side wall has a latching formation shaped to engage with the first protuberance and the second side wall has first and second spaced complementary formations each shaped to engage with the second protuberance whereby a free end of the flap is disposed at a first distance below the top of the frame when the first complementary formation is engaged with the second proturberance and at a second distance below the top of the frame when the second complementary formation is so engaged.

5 Claims, 1 Drawing Sheet

VEHICLE OPENING ROOF

This invention relates to an opening roof for a vehicle. The interior of a vehicle roof is clad with roof trim. It is common to provide a trim member to cover the gap between the static part of an opening roof assembly and and the adjacent roof trim. The thickness of such trim varies substantially from one type of vehicle to another.

According to the invention, an opening roof for a motor vehicle comprises a frame adapted to be mounted in an opening in a vehicle roof, movable closure means mounted in the frame and a trim member attached to the bottom of the frame so as to project outwardly therefrom, wherein the frame has a portion extending round the opening below the vehicle roof with a inner side surface facing towards the opening and an outer side surface facing away from the opening with a first protuberance formed on the inner side surface and a second protuberance formed on the outer side surface, and the trim member comprises a body portion having first and second side walls projecting therefrom so as to abut against the inner and outer side surfaces of the frame respectively and a flap projecting laterally from the body portion adjacent to its junction with the second side wall, the first side wall having a latching formation shaped to engage with the first protuberance and the second side wall having first and second spaced complementary formations each shaped to engage with the second protuberance whereby the free end of the flap is disposed at a first distance below the top of the frame when the first complementary formation is engaged with said protuberance and at a second distance below the top of the frame when the second complementary formation is so engaged.

Thus, a single trim member can be used with two different thicknesses of vehicle roof trim.

An embodiment of the invention will now be described, by way of example, with reference to the accompanying drawings, in which.

Figure 1:
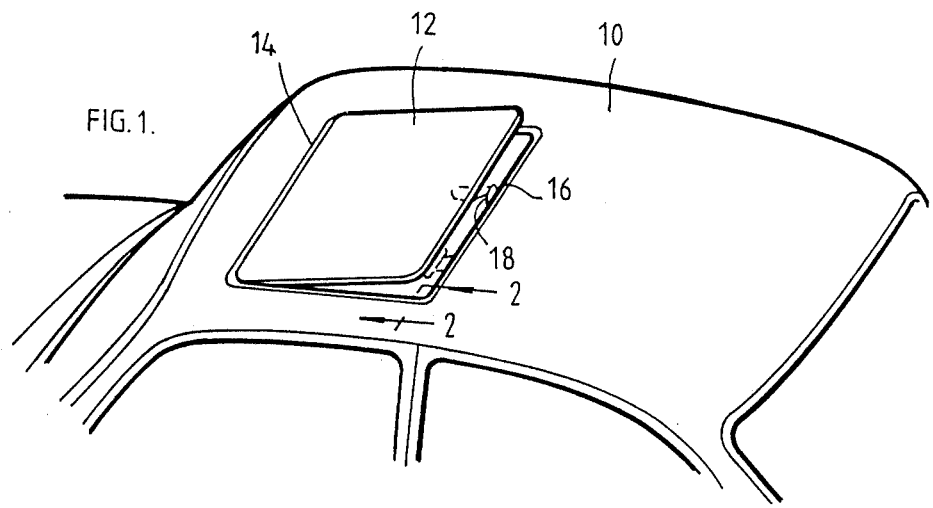
FIG. 1 is a perspective view of the top of a motor car having an opening roof in accordance with the invention.

Referring to FIG. 1, a roof 10 of a motor vehicle has an opening which is filled by a panel 12 hinged along its leading edge 14 to a frame 16 which bounds the opening. An opening mechanism 18 at the rear of the panel 12 is arranged to hold the panel 12 in a fully open position as illustrated or in a fully closed position in which the panel 12 is level with the vehicle roof.

Figure 2:
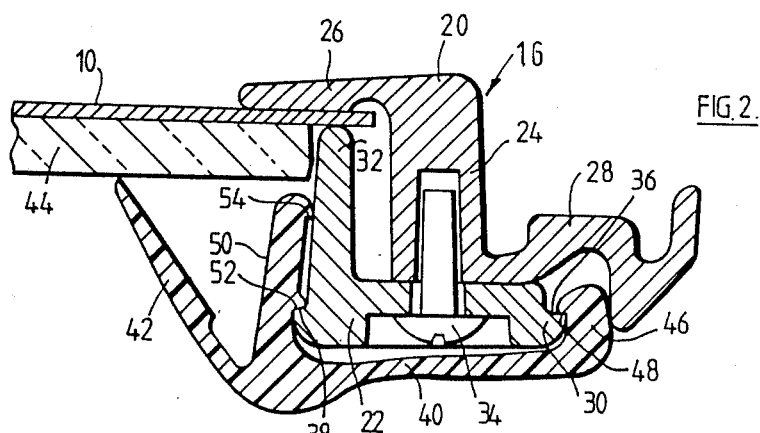
FIG. 2 is a cross-sectional view taken on the line 2—2 in FIG. 1.

Referring to FIG. 2, the frame 16 comprises a main frame member 20 and a clamping ring 22. The main frame member 20 has a vertical portion 24 projecting through the opening in the vehicle roof, an upper flange 26 which overlies the edge of the vehicle roof and a lower flange 28 which projects inwardly with respect to the opening and carries a seal (not shown) for engagement with the panel 12.

The clamping ring 22 is of L-shaped cross-section, having a horizontal limb 30 and a vertical limb 32. The horizontal limb 30 is secured to the bottom of the vertical portion 24 of the main frame member 20 by screws 34, so that the vertical limb 32 engages with the underside of the vehicle roof 10 and thus presses the bottom of the upper flange 26 firmly into engagement with th upper side thereof. The end of the horizontal limb 30 further from the vertical limb 32, which forms an inner side surface facing towards the opening in the vehicle roof, carries an upwardly facing shoulder 36. The outer side surface of the vertical limb 32, which faces away from the opening in the vehicle roof, carries a second upwardly facing shoulder 38.

A trim ring formed of resilient plastics material has a main body portion 40 secured to the bottom of the clamping ring 22 and a flap 42 arranged so that its free end is in resilient engagement with trim material 44 secured to the under side of the vehicle roof 10. A limb 46 projects upwardly from the end of body portion 40 remote from the flap 42 and carries a formation 48 which engages round the shoulder 36 on the clamping ring 22. A second limb 50 projects upwardly from the junction between the body portion 40 and the flap 42 and has a first formation 52 which, in FIG. 2, engages with the shoulder 38, and a second formation 54 nearer to the free end of the limb 50 than the formation 52. The flap 42 extends from body portion 40 adjacent second limb 50. Formation 48 is resiliently urged toward formations 52 and 54 when the trim ring is mounted to the clamping ring 22 with the limbs 46 and 50 abutting the inner and outer surfaces and the formations engaging shoulders 36 and 38.

Figure 3:
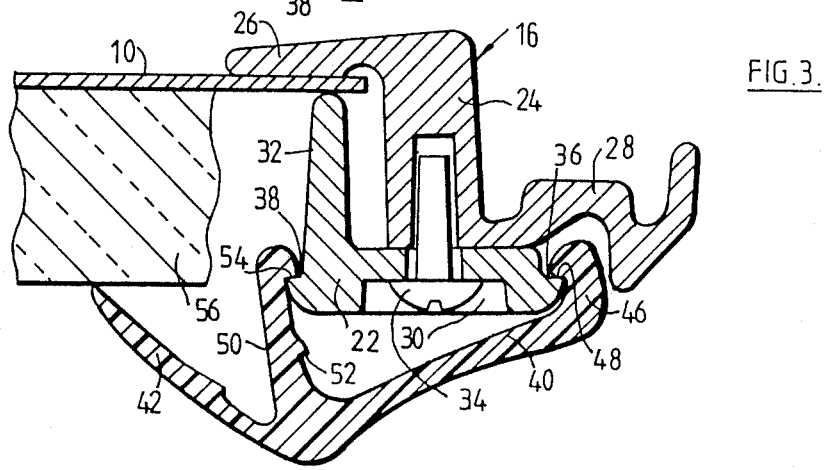
FIG. 3 is a cross-sectional view, similar to FIG. 2, but showing the invention used with a vehicle having thicker interior roof trim.

Referring to FIG. 3, if the roof trim material 44 of FIG. 2 is replaced with thicker roof trim 56, the formation 54 can engage with the shoulder 38 so as to allow the flap 42 to extend at approximately the same angle to the main portion body 40 of the trim ring as it did in FIG. 2. Intermediate thicknesses of trim can be accommodated by bending the flap 42 to a greater or lesser extent than that illustrated. The invention thus enables the same trim ring to be used with vehicle roof trim of a wide range of thickness.

The invention can be used with other types of opening roof than that illustrated in FIG. 1.

What is claimed is:

1. An opening roof for a motor vehicle, comprising a frame adapted to be mounted in an opening in a vehicle roof, movable closure means mounted in the frame and a trim member attached to the bottom of the frame so as to project outwardly therefrom, wherein the frame has a portion extending round the opening below the vehicle roof with an inner side surface facing towards the opening and an outer side surface facing away from the opening with a first protuberance formed on the inner side surface and a second protuberance formed on the outer side surface, and the trim member comprises a U-shaped body portion having first and second side walls projecting therefrom as legs of the U-shaped body portion and a resilient flap projecting laterally from the body portion adjacent to its junction with the second side wall, the first side wall having a latching formation shaped to engage with the first protuberance and the second side wall having first and second spaced complementary formations each shaped to engage with the second protuberance whereby the end of the flap furthest from its junction with the body portion is disposed at a first distance below the top of the frame when the first complementary formation is engaged with the second protuberance and at a second distance below the top of the frame when the second complementary formation is so engaged such that the end of the flap is capable of engaging trim material having thickness variations between the first and second distances.

2. An opening roof according to claim 1, wherein the trim member is formed of a resilient plastics material, the body portion being shaped so that the latching formation is resiliently urged towards the first and second complementary formations and the flap being so shaped that its free end is urged upwardly.

3. An opening roof according to claim 2, wherein the frame comprises a main frame member having an abutment surface engaging with the upper surface of the vehicle roof, and a clamping member secured to the main frame member and having an abutment surface engaging with the underside of the vehicle roof, the first and second protuberances being formed on the clamping member.

4. An opening roof according to claim 1, wherein the frame comprises a main frame member having an abutment surface engaging with the upper surface of the vehicle roof, and a clamping member secured to the main frame member and having an abutment surface engaging with the underside of the vehicle roof, the first and second protuberances being formed on the clamping member.

5. An opening roof for a motor vehicle, comprising a frame adapted to be mounted in an opening in a vehicle roof, movable closure means mounted in the frame and a trim member attached to the bottom of the frame so as to project outwardly therefrom, wherein the frame has a portion extending round the opening below the vehicle roof with an inner side surface facing towards the opening and an outer side surface facing away from the opening with a first protuberance formed on the inner side surface and a second protuberance formed on the outer side surface, and the trim member is formed of a resilient plastics material and comprises a U-shaped body portion having first and second side walls projecting therefrom as legs of the U-shaped body portion and a flap projecting laterally from the body portion adjacent to its junction with the second side wall, the first side wall having a latching formation shaped to engage with the first protuberance and the second side wall having first and second spaced complementary formations each shaped to engage with the second protuberance whereby the end of the flap furthest from its junction with the body portion is disposed at a first distance below the top of the frame when the first complementary formation is engaged with the second protuberance and at a second distance below the top of the frame when the second complementary formation is so engaged, wherein, when the opening roof is installed ina motor vehicle, the flap is capable of resiliently engaging vehicle trim material of at least thicknesses intermediate the first and second distances.

* * * * *